(12) United States Patent
Chen

(10) Patent No.: US 10,747,035 B2
(45) Date of Patent: Aug. 18, 2020

(54) LIQUID CRYSTAL PANEL

(71) Applicant: SHENZHEN CHINA STAR OPTOELECTRONICS TECHNOLOGY CO.,LTD., Shenzhen, Guangdong (CN)

(72) Inventor: Shuai Chen, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/322,035

(22) PCT Filed: Sep. 13, 2018

(86) PCT No.: PCT/CN2018/105411
§ 371 (c)(1),
(2) Date: Jan. 30, 2019

(87) PCT Pub. No.: WO2020/019432
PCT Pub. Date: Jan. 30, 2020

(65) Prior Publication Data
US 2020/0033654 A1  Jan. 30, 2020

(30) Foreign Application Priority Data

Jul. 26, 2018 (CN) .......................... 2018 1 0833332

(51) Int. Cl.
G09G 3/36 (2006.01)
G02F 1/133 (2006.01)
G02F 1/1362 (2006.01)
G02F 1/1343 (2006.01)

(52) U.S. Cl.
CPC ........ *G02F 1/13306* (2013.01); *G02F 1/1343* (2013.01); *G02F 1/136286* (2013.01); *G09G 3/3648* (2013.01)

(58) Field of Classification Search
None
See application file for complete search history.

(56) References Cited

U.S. PATENT DOCUMENTS

| 9,972,261 | B2 * | 5/2018 | Wang ................... G09G 3/3648 |
| 2015/0187302 | A1 * | 7/2015 | Dai ....................... G09G 3/3677 345/92 |
| 2015/0279289 | A1 * | 10/2015 | Yu ....................... G02F 1/13306 345/690 |

* cited by examiner

Primary Examiner — Dorothy Harris
(74) Attorney, Agent, or Firm — Maschoff Brennan

(57) ABSTRACT

A GOA circuit including a plurality of cascade single-stage GOA circuit units, wherein each of the single-stage GOA circuit units includes: a first pull-down maintaining unit connected to a low power source voltage line and including a first output end; a second pull-down maintaining unit connected to the low power source voltage line and including a second output end; a first compensation unit connected to the first pull-down maintaining unit and configured to connect the first input end to a pre-charging node and a high power source voltage line in response to a first control signal and a second control signal, respectively; and a second compensation unit connected to the second pull-down maintaining unit and configured to connect the second input end to the high power source voltage line and the pre-charging node in response to the first control signal and the second control signal, respectively.

10 Claims, 3 Drawing Sheets

LIQUID CRYSTAL PANEL

TECHNICAL FIELD

The present disclosure relates to display technical field, and more particularly, to a liquid crystal panel including a GOA (Gate Driver On Array) circuit.

BACKGROUND ART

A liquid crystal display has been widely applied to products, such as laptop computers, PDAs (Personal Digital Assistants), flat-screen TVs, mobile phones or the like, due to its merits of low radiation, small volume, low power consumption and the like. A conventional liquid crystal display drives a chip on a display panel using an external driving chip to display images. However, in order to reduce the number of elements and reduce manufacturing cost, it is gradually developed to directly manufacture a driving circuit structure onto the display panel by adopting for example a GOA technique in recent years.

The GOA technique is integrating a gate driving circuit of a TFT LCD (Thin Film Transistor Liquid Crystal Display) on a glass substrate to form scan driving for a liquid crystal panel. In comparison with a traditional driving technique by using COF (Chip On Flex/Film), the GOA technique may save the manufacturing cost significantly, also omit a bonding process of COF at a side of a gate, and offer great advantages for enhancing production capacity. Thus, the GOA is a major technique of the development of the future liquid crystal panel.

As shown in FIG. 1, a GOA circuit of a current liquid crystal panel generally includes a plurality of cascade single-stage GOA circuit units, and each of the single-stage GOA circuit units corresponds to a scan driving line in a corresponding level. Each single-stage GOA circuit unit may include: a pull-up control unit ①, a pull-up unit ②, a signal downlink unit ③, a pull-down unit ④, a pull-down maintaining unit ⑤, and a bootstrap capacitance ⑥.

In FIG. 1, the pull-up control unit ① is mainly used for implementing pre-charging of a pre-charging node Q(N), to which a start signal ST(N−1) and a scan driving signal G(N−1) from a GOA circuit unit of an upper stage are generally input. The pull-up unit ② is mainly used for increasing a potential of a scan driving signal G(N) of a current level. The signal downlink unit ③ is mainly used for controlling turning on and off signal transmission to a GOA circuit unit of a lower stage. The pull-down unit ④ is mainly used for pulling down potentials of the pre-charging node Q(N) and the scan driving signal G(N) of the current level to a low power source voltage VSS. The pull-down maintaining unit ⑤ is mainly used for maintaining the potentials of the pre-charging node Q(N) and the scan driving signal G(N) of the current level at the low power source voltage VSS unchangeable. The bootstrap capacitance ⑥ is mainly used for proving and maintaining the potential of the pre-charging node Q(N), and this is helpful for the pull-up unit ② to output the scan driving signal G(N).

The pull-down maintaining unit ⑤ actually includes an inverter. For example, the pull-down maintaining unit ⑤ may be constituted by using a Darlington inverter, of which a specific circuit structure is shown in FIG. 2. The Darlington inverter may include four thin film transistors and has an input end Input and an output end Output. If a control signal LC is set to be a high potential signal always and a low power source voltage VSS is set to be a low potential signal always, the output end Output outputs the low potential signal when the input end Input inputs the high potential signal, and the output end Output outputs the high potential signal when the input end Input inputs the low potential signal. When the pull-down maintaining unit ⑤ includes the Darlington inverter as shown in FIG. 2, its specific circuit structure may be illustrated in FIG. 3: taking a 2CK signal as an example, two pull-down maintaining units 1 and 2 are generally provided to work alternatively to prevent thin film transistors T32, T42, T33 and T43 from being affected by a PBS (Positive Bias Stress) for long time so that a threshold voltage $V_{th}$ of a device is caused to drift positively, thereby causing a device failure of the GOA circuit.

FIG. 4 is an equivalent circuit diagram of a thin film transistor (TFT). As shown in FIG. 4, three electrodes of the TFT will be referred to as a gate electrode Gate, a source electrode Source and a drain electrode Drain, respectively, in the present disclosure. Correspondingly, voltages applied to the electrodes are marked as Vg, Vs and Vd, respectively. Here, the source electrode Source and the drain electrode Drain do not have any difference in fact. In order to facilitate explanation, in exemplary embodiments, generally, an end having the lower voltage is referred to as a source electrode Source, while the other end having the higher voltage is referred to as a drain electrode Drain. Thus, a voltage Vgs for determining an On-state of the TFT satisfies Vgs=Vg−Vs. When Vgs>0, the TFT is in the On-state, a current flows from the drain electrode Drain to the source electrode Source; and when Vgs<0, the TFT is in an Off-state. Selectively, in other exemplary embodiments, an end having the lower voltage of the TFT may also be referred to as a drain electrode Drain, while the other end having the higher voltage of the TFT is referred to as a source electrode Source, that is, when the TFT is in the On-state, the current flows from the source electrode Source to the drain electrode Drain.

Next, a technical problem to be encountered by the present disclosure will be illustrated. A waveform of the control signal LC may be set according to FIG. 5. Referring to FIG. 3 together with FIG. 5, when a first control signal LC1 is at a high potential and a second control signal LC2 is at a low potential, the pull-down maintaining unit 1 is in a working state, while the pull-down maintaining unit 2 is in a closed state. At this moment, a point A is at the high potential, the TFTs T32 and T42 are affected by the PBS; and a point B is at the low potential, the TFTs T33 and T43 are affected by an NBS (Negative Bias Stress). Similarly, when the first control signal LC1 is at the low potential and the second control signal LC2 is at the high potential, the pull-down maintaining unit 2 is in the working state, while the pull-down maintaining unit 1 is in the closed state. At this moment, the point A is at the low potential, the TFTs T32 and T42 may be affected by the NBS; and the point B is at the high potential, the TFTs T33 and T43 may be affected by the PBS. Thus, during a period of time, the TFTs T32, T42, T33 and T43 located between the point A and the point B may be affected not only by the PBS but also by the NBS such that the device failure caused due to charge trapping may be relieved to an extent.

However, as for another TFTs in FIG. 3, for example, as for four TFTs T52, T54, T62 and T64, cases are significantly different. Gate electrodes of the above four TFTs are all connected to a point Q. The point Q is a pre-charging node, which is at the high potential only when the scan lines of the upper level and the current level are turned on while is at the low potential at other times. Thus, a time duty ratio of the low and high potentials of the point Q may be estimated as about 2:(n−2), wherein n is the number of scan lines of the display panel. Accordingly, since the point Q is at the low potential for a long term, the device failure will be easily caused because the four TFT devices will be affected by the NBS for the long term.

SUMMARY OF INVENTION

Exemplary embodiments of the present disclosure aim to provide a liquid crystal panel including a GOA circuit having a plurality of cascade single-stage GOA circuit units. In each of the single-stage GOA circuit units, a re-design is performed with respect to an inverter included in a pull-down maintaining unit so that a plurality of TFTs constituting the inverter may work alternatively in a PBS state and an NBS state, thereby relieving a problem of device failure due to charging trapping.

The exemplary embodiments of the present disclosure disclose a liquid crystal panel including a GOA circuit, the GOA circuit including a plurality of cascade single-stage GOA circuit units, wherein each of the single-stage GOA circuit units includes: a first pull-down maintaining unit connected to a low power source voltage line VSS and including a first inverter having a first input end and a first output end; a second pull-down maintaining unit connected to the low power source voltage line and including a second inverter having a second input end and a second output end; a first compensation unit connected to the first pull-down maintaining unit and configured to connect the first input end to a pre-charging node in response to a first control signal and connect the first input end to a high power source voltage line in response to a second control signal; and a second compensation unit connected to the second pull-down maintaining unit and configured to connect the second input end to the high power source voltage line in response to the first control signal and connect the second input end to the pre-charging node in response to the second control signal.

Further, the high power source voltage line may be supplied with a first high voltage level, and the lower power source voltage line may be supplied with a first low voltage level, wherein a voltage level of the first control signal is greater than the first high voltage level, and a voltage level of the second control signal is less than the first low voltage level.

Further, the first compensation unit may include: a first transistor configured such that a gate electrode thereof receives the first control signal, a source electrode thereof is electrically connected to the pre-charging node, and a drain electrode thereof is connected to a second transistor and the first input end; and the second transistor configured such that a gate electrode thereof receives the second control signal, a source electrode thereof is electrically connected to the high power source voltage line, and a drain electrode thereof is connected to the first transistor and the first input end.

Further, the second compensation unit may include: a third transistor configured such that a gate electrode thereof receives the second control signal, a source electrode thereof is electrically connected to the pre-charging node, and a drain electrode thereof is connected to a fourth transistor and the second input end; and the fourth transistor configured such that a gate electrode thereof receives the first control signal, a source electrode thereof is electrically connected to the high power source voltage line, and a drain electrode thereof is connected to the first transistor and the second input end.

Further, the first inverter may include: a fifth transistor configured such that a gate electrode thereof is input the first control signal, a source electrode and the gate electrode thereof are in diode connection, and a drain electrode thereof is connected to a source electrode of a sixth transistor and a gate electrode of a seventh transistor; the sixth transistor configured such that a gate electrode thereof is connected to the first input end, the source electrode thereof is connected to the drain electrode of the fifth transistor, and a drain electrode thereof is connected to the low power source voltage line; the seventh transistor configured such that the gate electrode thereof is connected to the drain electrode of the fifth transistor, a source electrode thereof is input the first control signal, and a drain electrode thereof is connected to the first output end; and an eighth transistor configured such that a gate electrode thereof is connected to the gate electrode of the sixth transistor, a source electrode thereof is connected to the first output end, and a drain electrode thereof is connected to the low power source voltage line.

Further, the second inverter may include: a ninth transistor configured such that a gate electrode thereof is input the second control signal, a source electrode and the gate electrode thereof are in diode connection, and a drain electrode thereof is connected to a source electrode of a tenth transistor and a gate electrode of an eleventh transistor; the tenth transistor configured such that a gate electrode thereof is connected to a gate electrode of a twelfth transistor, the source electrode thereof is connected to the drain electrode of the ninth transistor, and a drain electrode thereof is connected to the low power source voltage line; the eleventh transistor configured such that the gate electrode thereof is connected to the drain electrode of the ninth transistor, a source electrode thereof is input the second control signal, and a drain electrode thereof is connected to the second output end; and the twelfth transistor configured such that the gate electrode thereof is connected to the second input end, a source electrode thereof is connected to the second output end, and a drain electrode is connected to the low power source voltage line.

Further, the first pull-down maintaining unit may further include: a thirteenth transistor configured such that a gate electrode thereof is connected to the first output end, a source electrode thereof is connected to a scan driving line of a current level, and a drain electrode thereof is connected to the low power source voltage line; and a fourteenth transistor configured such that a gate electrode thereof is connected to the gate electrode of the thirteenth transistor, a source electrode thereof is connected to the pre-charging node, and a drain electrode thereof is connected to the low power source voltage line.

Further, the second pull-down maintaining unit may further include: a fifteenth transistor configured such that a gate electrode thereof is connected to the second output end, a source electrode thereof is connected to the scan driving line of the current level, and a drain electrode thereof is connected to the low power source voltage line; and a sixteenth transistor configured such that a gate electrode thereof is connected to the gate electrode of the fifteenth transistor, a source electrode thereof is connected to the pre-charging node, and a drain electrode thereof is connected to the low power source voltage line.

Further, each single-stage GOA circuit unit may further include a pull-up control unit which may include a seventeenth thin film transistor, of which a gate electrode is input a start signal from a GOA circuit unit of an upper stage, a drain electrode is input a scan driving signal from the GOA circuit unit of the upper stage, and a source electrode is connected to the pre-charging node.

Further, each single-stage GOA circuit unit may further include a pull-up unit, a pull-down unit, a signal downlink unit and a bootstrap capacitance, wherein the pull-up unit may include an eighteenth transistor, of which a gate electrode is connected to a first electrode of the bootstrap capacitance and the pre-charging node, a source electrode is connected to the scan driving line of the current level to output a scan driving signal, and a drain electrode is input a clock signal of the current level; wherein the signal downlink unit may include a nineteenth transistor, of which a gate electrode is connected to the gate electrode of the eighteenth transistor, a drain electrode is connected to the drain electrode of the eighteenth transistor, and a source electrode outputs the start signal of the current level to be transmitted to a GOA circuit unit of a next stage; wherein the first electrode of the bootstrap capacitance may be connected to the pre-charging node, and a second electrode of the bootstrap capacitance may be connected to the scan driving line of the current level; and wherein the pull-down unit may include a twentieth transistor and a twenty-first transistor, gate electrodes thereof abutting each other, drain electrodes thereof both being connected to the low voltage power source line, a source electrode of the twentieth transistor being connected to the scan driving line of the current level, and a drain electrode of the twenty-first transistor being connected to the pre-charging node.

BRIEF DESCRIPTION OF THE DRAWINGS

These and/or other aspects and advantages of the present disclosure will become more apparent from the following description of the embodiments, taken in conjunction with the accompanying drawings in which.

DETAILED DESCRIPTION OF EXEMPLARY EMBODIMENTS

One or more exemplary embodiments disclosed by the present disclosure will be described in more details by referring to the accompanying drawings now. Those same or corresponding components may be identified using the same reference signs, and repeated explanations are omitted.

The terms are used here only out of purpose of describing the specific exemplary embodiments, rather than limiting a concept of the present disclosure. For example, "one" and "the (said)" in a singular form used here intend to include a plural form unless they are clearly pointed out additionally in the text. It should be understood that when terms "comprise" and "include" are used in the description, it is indicated that the features, whole, steps, operations, components, elements and/or their combinations exist but does not exclude the case where one or more other features, whole, steps, operations, components, elements and/or their combinations may exist or may be additionally added.

Figure 6:
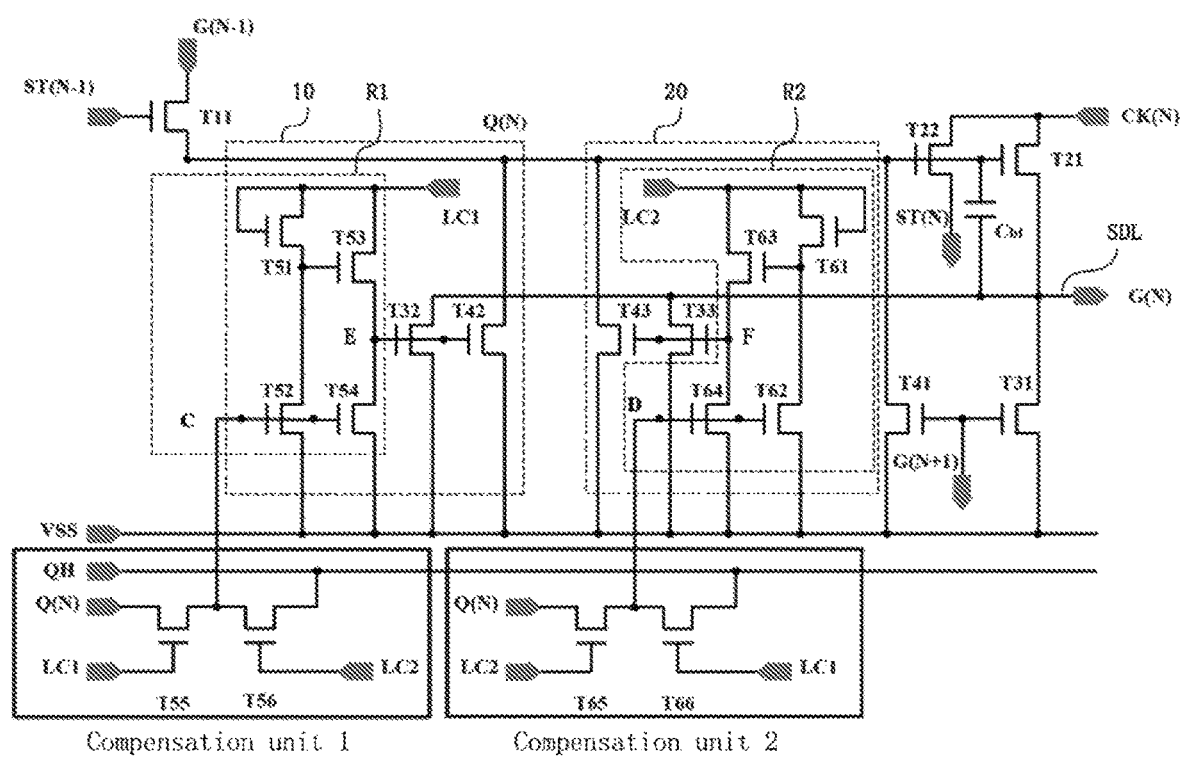
FIG. 6 is a circuit diagram of a single-stage GOA circuit unit according to exemplary embodiments of the present disclosure.

FIG. 6 is a circuit diagram of a single-stage GOA circuit unit according to exemplary embodiments of the present disclosure. A liquid crystal panel according to an exemplary embodiment of the present disclosure includes a GOA circuit, the GOA circuit including a plurality of cascade single-stage GOA circuit units. As shown in FIG. 6, each single-stage GOA circuit unit includes: a first pull-down maintaining unit 10, a second pull-down maintaining unit 20, a first compensation unit 1, and a second compensation unit 2. The first compensation unit 1 and the second compensation unit 2 are connected to the first pull-down maintaining unit 10 and the second pull-down maintaining unit 20, respectively. In the present embodiment, the first pull-down maintaining unit 10 is connected to a low power source voltage line VSS and includes a first inverter R1 having a first input end C and a first output end E; the second pull-down maintaining unit 20 is connected to the low power source voltage line VSS and includes a second inverter R2 having a second input end D and a second output end F; the first compensation unit 1 is configured to connect the first input end C to a pre-charging node Q(N) in response to a first control signal LC1, and is configured to connect the first input end C to a high power source voltage line QH in response to a second control signal LC2; and the second compensation unit 2 is configured to connect the second input end D to the high power source voltage line QH in response to the first control signal LC1, and is configured to connect the second input end D to the pre-charging node Q(N) in response to the second control signal LC2.

Figure 3:
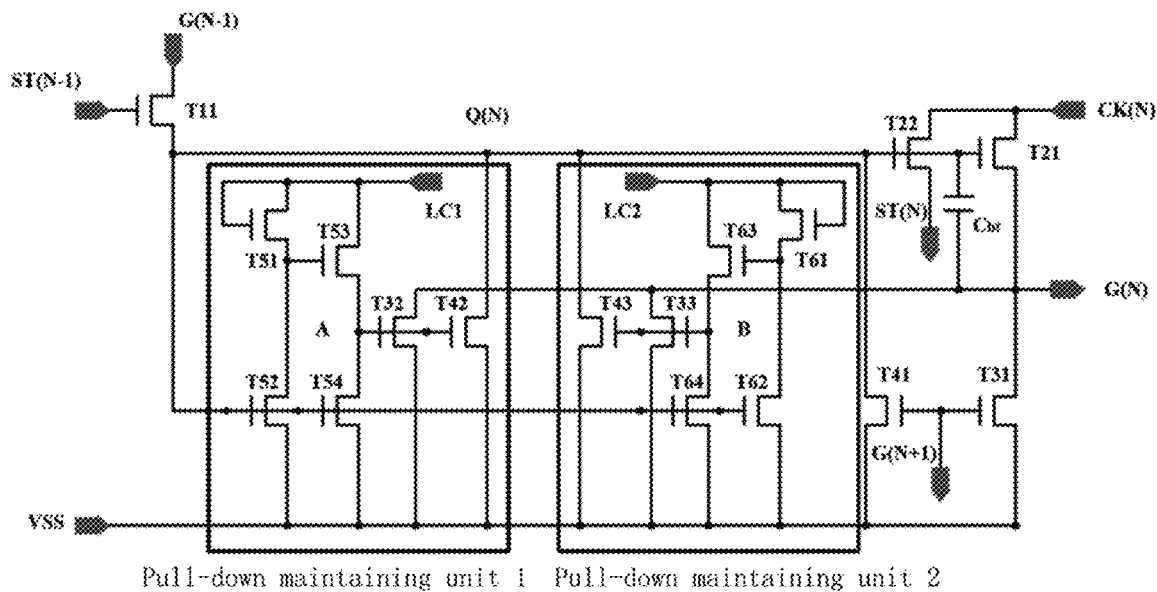
FIG. 3 is a detailed circuit diagram of FIG. 1.
Figure 4:
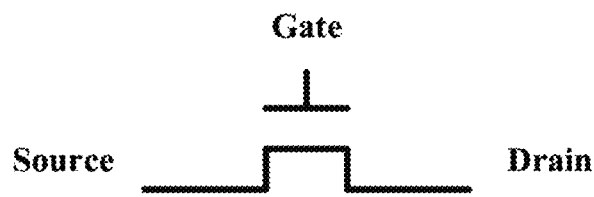
FIG. 4 is an equivalent circuit diagram of a thin film transistor (TFT)

In comparison with the single-stage GOA circuit unit illustrated in FIG. 3, the single-stage GOA circuit unit included by the liquid crystal panel according to the exemplary embodiment of the present disclosure includes a re-designed pull-down maintaining unit structure, in which the compensation units are added to prevent TFT devices in the inverter from working in a same state for a long term, thereby improving a stability of the inverter and resolving a device failure problem caused due to charge trapping.

Hereinafter, the concept of the present disclosure will be described in details in conjunction with the specific embodiments.

In an exemplary embodiment of the present disclosure, a thin film transistor included in a GOA circuit may be a high voltage level conductive thin film transistor, such as a high voltage level conductive a-Si thin film transistor or a NMOS transistor. However, the present is not limited thereto. A thin film transistor included in a GOA circuit may also be a low voltage level conductive thin film transistor, such as a PMOS thin film transistor. In order for convenient description, the illustration will be made by taking all of the thin film transistors included in a single-stage GOA circuit unit being high voltage level conductive transistors as an example in the following descriptions.

Figure 1:
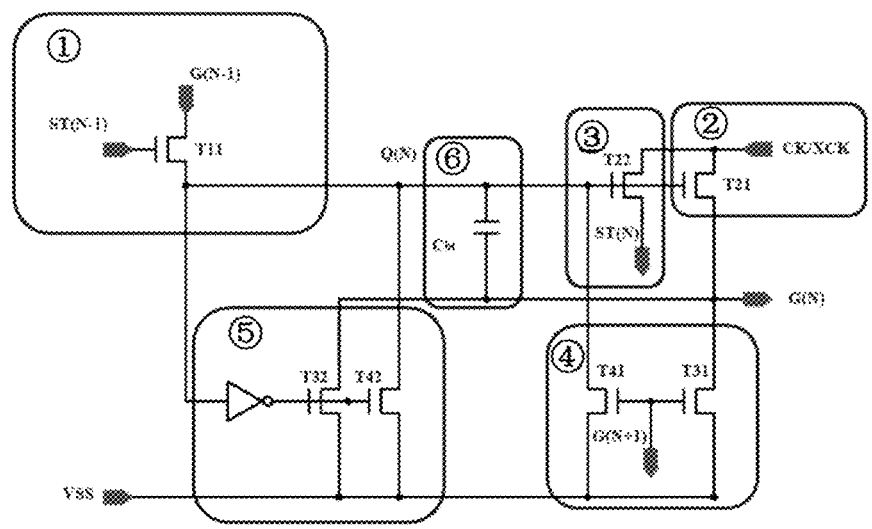
FIG. 1 is a diagram illustrating a single-stage GOA circuit unit in the prior art.
Figure 2:
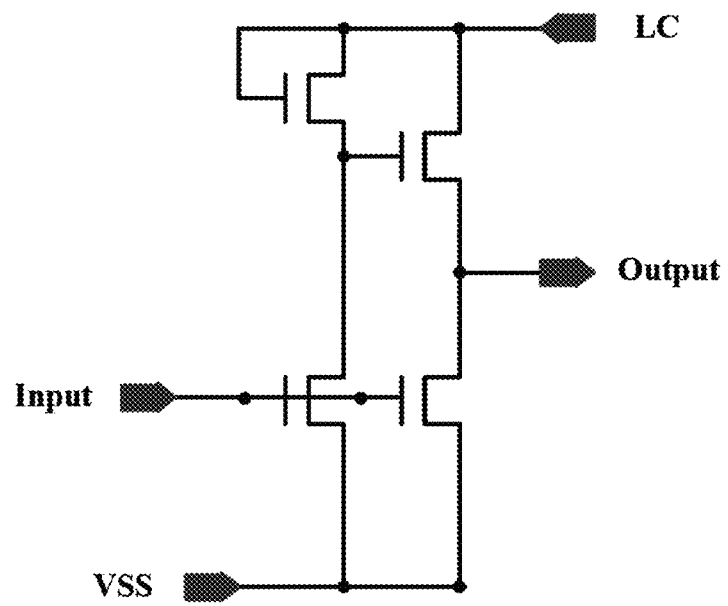
FIG. 2 is a diagram illustrating a circuit of a Darlington inverter included in the pull-down maintaining circuit unit of FIG. 1.
Figure 5:
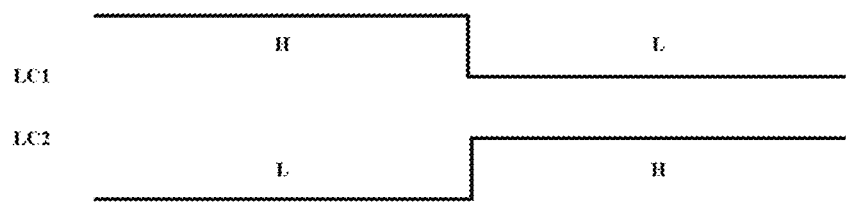
FIG. 5 is a diagram illustrating a waveform of a control signal of the single-stage GOA circuit unit of FIG. 3.

In addition, in order to facilitate description, the concept of the present disclosure will be hereinafter described by taking the first inverter R1 and the second inverter R2 both are the Darlington inverter shown in FIG. 2 as an example. In addition, it is assumed that the control signal LC has a waveform as shown in FIG. 5.

Referring to FIG. 6, the first compensation unit 1 and the second compensation unit 2 of the GOA circuit unit of the current stage both are connected to the high power source voltage line QH. According to an exemplary embodiment of the present disclosure, the high power source voltage line QH may be supplied with a first high voltage level, such as, a direct current high voltage level. The low power source voltage line VVS may be supplied with a first low voltage level. In such the case, a voltage level $LC_{high}$ of the first control signal LC1 may be greater than the first high voltage level $V_{QH}$, and a voltage level $LC_{low}$ of the second control signal LC2 may be less than the first low voltage level $V_{VSS}$. In addition, a low voltage level of the pre-charging node Q(N) may be determined by the low power source voltage line VSS.

In the present exemplary embodiment, further, the first compensation unit 1 may include a first transistor T55 and a second transistor T56. The first transistor T55 may be configured such that the first control signal LC1 is received via its gate electrode, a source electrode thereof is electrically connected to the pre-charging node Q(N), and a drain electrode thereof is connected to a drain electrode of the second transistor T56 and the first input end C. The second transistor T56 may be configured such that the second control signal LC2 is received via its gate electrode, a source electrode thereof is electrically connected to the high power source voltage line QH, and the drain electrode thereof is connected to the drain electrode of the first transistor T55 and the first input end C.

In the present exemplary embodiment, further, the second compensation unit 2 may include a third transistor T65 and a fourth transistor T66. The third transistor T65 may be configured such that the second control signal LC2 is received via its gate electrode, a source electrode thereof is electrically connected to the pre-charging node Q(N), and a drain electrode thereof is connected to a drain electrode of the fourth transistor T66 and the second input end D. The fourth transistor T66 may be configured such that the first control signal LC1 is received via its gate electrode, a source electrode thereof is electrically connected to the high power source voltage line QH, and the drain electrode thereof is connected to the drain electrode of the third transistor T65 and the second input end D.

As described above, the first inverter R1 and the second inverter R2 in the present exemplary embodiment may be a Darlington inverter, thus, each of the pull-down maintaining units 1 and 2 may include a Darlington inverter. In such the case, referring to FIG. 6, the first inverter R1 may include the first input end C and a first output end E. The first inverter R1 may include a fifth transistor T51, a sixth transistor T52, a seventh transistor T53 and an eighth transistor T54. Specifically speaking, the fifth transistor T51 may be configured to receive the first control signal LC1 via its gate electrode. A source electrode of the fifth transistor T51 may be in diode connection with its gate electrode, and may be connected to a source electrode of the seventh transistor T53 to receive the first control signal LC1. A drain electrode of the fifth transistor T51 may be connected to a source electrode of the sixth transistor T52 and a gate electrode of the seventh transistor T53. In addition, the sixth transistor T52 may be configured such that a gate electrode thereof is connected to the first input end C, the source electrode thereof may be connected to the drain electrode of the fifth transistor T51, and a drain electrode thereof may be connected to the low power source voltage line VSS. The seventh transistor T53 may be configured such that the gate electrode thereof is connected to the drain electrode of the fifth transistor T51, a source electrode thereof may be input the first control signal LC1, and a drain electrode thereof may be connected to the first output end E. The eighth transistor T54 may be configured such that a gate electrode thereof is connected to the gate electrode of the sixth transistor T52, a source electrode thereof may be connected to the first output end E, and a drain electrode thereof may be connected to the low power source voltage line VSS.

Further, the second inverter R2 may include a second input end D and a second output end F. The second inverter R2 may include a ninth transistor T61, a tenth transistor T62, an eleventh transistor T63, and a twelfth transistor T64. Specifically speaking, the ninth transistor T61 may be configured to receive the second control signal LC2 via its gate electrode. A source electrode of the ninth transistor T61 may be in diode connection with its gate electrode, and may be connected to a source electrode of the eleventh transistor T63 to receive the second control signal LC2. A drain electrode of the ninth transistor T61 may be connected to a source electrode of the tenth transistor T62 and a gate electrode of the eleventh transistor T63. In addition, the tenth transistor T62 may be configured such that a gate electrode thereof is connected to a gate electrode of a twelfth transistor T64, a source electrode thereof is connected to the drain electrode of the ninth transistor T61, and a drain electrode thereof is connected to the low power source voltage line VSS. The eleventh transistor T63 may be configured such that the gate electrode thereof is connected to the drain electrode of the ninth transistor T61, a source electrode thereof may be input the second control signal LC2, and a drain electrode thereof may be connected to the second output end F. The twelfth transistor T64 may be configured such that the gate electrode thereof is connected to the second input end D, a source electrode thereof is connected to the second output end F, and a drain electrode thereof is connected to the low power source voltage line VSS.

According to the structure characteristics of the single-stage GOA circuit unit illustrated in FIG. 6, when the first control signal LC1 is at a high potential and the second control signal LC2 is at a low potential, the pull-down maintaining unit 10 and the first compensation unit 1 are in a working state. At the moment, Vgs of the first transistor T55 in the first compensation unit 1 satisfies Vgs>0, which is in an On-state; and Vgs of the second transistor T56 satisfies Vgs<0, which is in an Off-state. Since the first transistor T55 is turned on, the pre-charging node Q(N) is connected to the first input end C of the first inverter R1. A potential of the first input end point C is affected only by the potential of the pre-charging node Q(N) to be at a low potential, thus, the sixth transistor T52 and the eighth transistor T54 may be affected by the NBS.

On another aspect, when the first compensation unit 10 and the first compensation unit 1 are in the working state, the second pull-down maintaining unit 20 and the second compensation unit 2 are in the closed state. At the moment, Vgs of the third transistor T65 in the second compensation unit 2 satisfies Vgs<0, that is, the third transistor 65 is in an Off-state; while Vgs of the fourth transistor T66 satisfies Vgs>0, which is in the On-state. Since the fourth transistor T66 is turned on, the second input end D of the second inverter R2 is connected to the high power source voltage line QH. A potential of the second input end point D is affected only by the potential of the high power source voltage line QH to be at a high potential, thus, the tenth transistor T62 and the twelfth transistor T64 may be affected by the PBS.

Similarly, when the first control signal LC1 is at the low potential and the second control signal LC2 is at the high potential, the second pull-down maintaining unit 20 and the second compensation unit 2 are in the working state. At the moment, Vgs of the third transistor T65 in the second compensation unit 2 satisfies Vgs>0, which is in the On-state; and Vgs of the fourth transistor T66 satisfies Vgs<0, which is in the Off-state. Since the third transistor T65 is turned on, the second input end D of the second inverter R2 is connected to the pre-charging node Q(N). The potential of the second input end point D is affected only by the potential of the pre-charging node Q(N) to be at the low potential, thus, the tenth transistor T62 and the twelfth transistor T64 may be affected by the NBS.

On another aspect, when the second pull-down maintaining unit 20 and the second compensation unit 2 are in the working state, the first pull-down maintaining unit 10 and the first compensation unit 1 are in the closed state. At the moment, Vgs of the first transistor T55 in the first compensation unit 1 satisfies Vgs<0, that is, the first transistor T55 is in the Off-state; and Vgs of the second transistor T56 satisfies Vgs>0, which is in the On-state. Since the second transistor T56 is turned on, the first input end C of the first inverter R1 is connected to the high power source voltage line QH. The potential of the first input end point C is affected only by the potential of the high power source voltage line QH to be at the high potential, thus, the sixth transistor T52 and the eighth transistor T54 may be affected by the PBS.

Through the above description, it can be known that the sixth transistor T52 and the eighth transistor T54 in the first inverter R1 and the tenth transistor T62 and the twelfth transistor T64 in the second inverter R2 may alternatively work in the PBS state and the NBS state, thereby preventing them from working in one state for the long term and thus relieving the device failure problem caused by charge trapping.

As shown in FIG. 6, further, the first pull-down maintaining unit 10 may further include a thirteenth transistor T32 and a fourteenth transistor T42, wherein the thirteenth transistor T32 may be configured such that a gate electrode thereof is connected to the first output end E, a source electrode thereof may be connected to a scan driving line SDL of a current level, and a drain electrode thereof may be connected to the low power source voltage line VSS. The fourteenth transistor T42 may be configured such that a gate electrode thereof is connected to the gate electrode of the thirteenth transistor T32, a source electrode thereof may be connected to the pre-charging node Q(N), and a drain electrode thereof may be connected to the low power source voltage line VSS.

In addition, the second pull-down maintaining unit 20 may further include a fifteenth transistor T33 and a sixteenth transistor T43, wherein the fifteenth transistor T33 may be configured such that a gate electrode thereof is connected to the second output end F, a source electrode thereof may be connected to the scan driving line SDL of the current level, and a drain electrode thereof may be connected to the low power source voltage line VSS. The sixteenth transistor T43 may be configured such that a gate electrode thereof is connected to the gate electrode of the fifteenth transistor T33, a source electrode thereof may be connected to the pre-charging node Q(N), and a drain electrode thereof may be connected to the low power source voltage line VSS.

In such the case, when the first compensation unit 10 is in the working state while the second pull-down maintaining unit 20 is in the closed state, the pre-charging node Q(N) is maintained at the low potential. When the first control signal LC1 is at the high potential and the second control signal LC2 is at the low potential, the first input end C of the first inverter R1 is connected to the pre-charging node Q(N) so that the low voltage level is input. Accordingly, the first output end E of the first inverter R1 outputs the high voltage level such that the thirteenth transistor T32 and the fourteenth transistor T42 of the first pull-down maintaining unit 10 are turned on. Since the thirteenth transistor T32 is in the On-state such that the scan driving line SDL of the current level is maintained at the low potential and does not output a scan driving signal G(N) of the current level. Since the fourteenth transistor T42 is in the On-state such that the pre-charging node Q(N) is maintained at the low potential by the low power source voltage line VSS.

On contrary, when the first control signal LC1 is at the low potential and the second control signal LC2 is at the high potential, the first input end C of the first inverter R1 is connected to the high power source voltage line QH so that the high voltage level is input. Accordingly, the first output end E of the first inverter R1 outputs the low voltage level, the thirteenth transistor T32 and the tenth transistor T42 are turned off, and the first pull-down maintaining unit 10 does not work.

When the first pull-down maintaining unit 10 is in the closed state while the second pull-down maintaining unit 20 is in the working state, the pre-charging node Q(N) is still maintained at the low potential. Since the first control signal LC1 is at the low potential and the second control signal LC2 is at the high potential, the second input end D of the second inverter R2 is connected to the pre-charging node Q(N) so that the low voltage level is input. Accordingly, the second output end F of the second inverter R2 outputs the high voltage level such that the fifteenth transistor T33 and the sixteenth transistor T43 of the second pull-down maintaining unit 20 are turned on. The fifteenth transistor T33 is in the On-state such that the scan driving line SDL of the current level is maintained at the low potential and does not output the scan driving signal G(N) of the current level. The sixteenth transistor T43 is in the On-state such that the pre-charging node Q(N) is maintained at the low potential by the low power source voltage line VSS.

Through the above description, it can be known that when the first pull-down maintaining unit 10 and the second pull-down maintaining unit 20 work alternatively, the first compensation unit 1 and the second compensation unit 2 also work alternatively, such that the sixth transistor T52 and the eighth the transistor T54 in the first inverter R1 and the tenth transistor T62 and the twelfth transistor T64 in the second inverter R2 may work alternatively in the PBS state and the NBS state, thereby relieving the device failure problem caused by charge trapping and improving durability and reliability of a driving element of the liquid crystal panel.

In addition, in the exemplary embodiment illustrated in FIG. 6, each single-stage GOA circuit unit may further include a pull-up control unit 1. The pull-up control unit 1 may include a seventeenth thin film transistor T11, of which a gate electrode may be input a start signal ST(N−1) from a GOA circuit unit of an upper stage, a drain electrode may be input a scan driving signal G(N−1) from the GOA circuit unit of the upper stage, and a source electrode may be connected to the pre-charging node Q(N). When the start signal ST(N−1) from the GOA circuit unit of the upper stage is at the high voltage level, the seventeenth transistor T11 may be turned on such that the scan driving signal G(N−1) is input to the pre-charging node Q(N) to pre-charge the pre-charging node Q(N).

In addition, each single-stage GOA circuit unit may further include a pull-up unit 2, a pull-down unit 4, a signal downlink unit 3 and a bootstrap capacitance Cbt 6.

For example, referring to FIG. 6, the pull-up unit 2 may include an eighteenth transistor T21, of which a gate electrode may be connected to a first electrode of the bootstrap capacitance Cbt 6 and the pre-charging node Q(N), a source electrode may be connected to the scan driving line SDL of the current level to output the scan driving signal G(N), and a drain electrode may be input a clock signal CK(N) of the current level. The signal downlink unit 3 may include a nineteenth transistor T22, of which a gate electrode may be connected to the gate electrode of the eighteenth transistor T21, a drain electrode may be connected to the drain electrode of the eighteenth transistor T21, and a source electrode may output the start signal ST(N) of the current level to be transmitted to a GOA circuit unit of a next stage.

The pull-up unit 2 is mainly for increasing a potential of the scan driving signal G(N). When the scan driving line SDL of the current level is started, the pre-charging node Q(N) is at the high potential, and at the moment, the eighteenth transistor T21 and a nineteenth transistor T22 are turned on. When the clock signal CK(N) of the current level is at the high voltage level, the GOA circuit unit of the current stage may output the start signal ST(N) to the GOA circuit unit of the next stage and output the scan driving signal G(N) of the current level.

The bootstrap capacitance Cbt 6 utilizes a characteristic that voltages at both ends of a capacitance cannot change suddenly. When the both ends of the capacitance are maintained with certain voltages, a voltage at a negative end of the capacitance is increased, a voltage at a positive end is maintained to have an initial voltage difference from that of the negative end, and this means that the voltage at the positive end is boosted by the negative end. As shown in FIG. 6, one end of the bootstrap capacitance Cbt 6 is connected to the pre-charging node Q(N), and the other end is connected to the scan driving line SDL of the current level. This is mainly for maintaining and increasing the potential of the pre-charging node Q(N) to ensure downlink transmission of the start signal and the output of the scan driving signal.

The pull-down unit 4 may include a twentieth transistor T31 and a twenty-first transistor T41, gate electrodes thereof may abut each other, and drain electrodes thereof may be connected to the low voltage power source line VSS. A source electrode of the twentieth transistor T31 may be connected to the scan driving line SDL of the current level, and a drain electrode of the twenty-first transistor T41 may be connected to the pre-charging node Q(N). When a scan driving signal G(N+1) from the GOA circuit unit of the next stage is input to the gate electrodes of the twentieth transistor T31 and the twenty-first transistor T41, the twentieth transistor T31 and the twenty-first transistor T41 may be turned on such that the potentials of the pre-charging node Q(N) and the scan driving signal G(N) are pulled down to the low power source voltage VSS.

Subsequently, the first pull-down maintaining unit 10 and the second pull-down maintaining unit 20 work alternatively to maintain the pre-charging node Q(N) at the low potential. During this process, since each single-stage GOA circuit unit of the GOA circuit included by the liquid crystal panel according to the exemplary embodiment of the present disclosure includes a first compensation unit and a second compensation unit, such that the devices in the first pull-down maintaining unit and the second pull-down maintaining unit are prevented from working in a same bias state for long term, thereby relieving the device failure problem caused due to charge trapping and further improving durability and reliability of the liquid crystal panel.

The contents mentioned above are examples of the present disclosure and should not be explained as the limitation of the present disclosure. Although some embodiments of the present disclosure have been described, those skilled in the art will easily understand that many amendments may be made in the embodiments without departing from features and aspects of the present disclosure in substance. Thus, such the amendments are intended to be included in the scope of the present disclosure defined by the claims and other equivalents.

What is claimed is:

1. A liquid crystal panel comprising a GOA circuit, the GOA circuit comprising a plurality of cascade single-stage GOA circuit units, wherein each of the single-stage GOA circuit units comprises:
    a first pull-down maintaining unit connected to a low power source voltage line and comprising a first inverter having a first input end and a first output end;
    a second pull-down maintaining unit connected to the low power source voltage line and comprising a second inverter having a second input end and a second output end;
    a first compensation unit connected to the first pull-down maintaining unit and configured to connect the first input end to a pre-charging node in response to a first control signal and connect the first input end to a high power source voltage line in response to a second control signal; and
    a second compensation unit connected to the second pull-down maintaining unit and configured to connect the second input end to the high power source voltage line in response to the first control signal and connect the second input end to the pre-charging node in response to the second control signal.

2. The liquid crystal panel of claim 1, wherein the high power source voltage line is supplied with a first high voltage level, and the low power source voltage line is supplied with a first low voltage level,
    wherein a voltage level of the first control signal is greater than the first high voltage level, and a voltage level of the second control signal is less than the first low voltage level.

3. The liquid crystal panel of claim 2, wherein the first compensation unit comprises:
    a first transistor configured such that a gate electrode thereof receives the first control signal, a source electrode thereof is electrically connected to the pre-charging node, and a drain electrode thereof is connected to a second transistor and the first input end; and
    the second transistor configured such that a gate electrode thereof receives the second control signal, a source electrode thereof is electrically connected to the high power source voltage line, and a drain electrode thereof is connected to the first transistor and the first input end.

4. The liquid crystal panel of claim 3, wherein the second compensation unit comprises:
    a third transistor configured such that a gate electrode thereof receives the second control signal, a source electrode thereof is electrically connected to the pre-charging node, and a drain electrode thereof is connected to a fourth transistor and the second input end; and
    the fourth transistor configured such that a gate electrode thereof receives the first control signal, a source electrode thereof is electrically connected to the high power source voltage line, and a drain electrode thereof is connected to the first transistor and the second input end.

5. The liquid crystal panel of claim 3, wherein the first inverter comprises:
   a fifth transistor configured such that a gate electrode thereof is input the first control signal, a source electrode and the gate electrode thereof are in diode connection, and a drain electrode thereof is connected to a source electrode of a sixth transistor and a gate electrode of a seventh transistor;
   the sixth transistor configured such that a gate electrode thereof is connected to the first input end, the source electrode thereof is connected to the drain electrode of the fifth transistor, and a drain electrode is connected to the low power source voltage line;
   the seventh transistor configured such that the gate electrode thereof is connected to the drain electrode of the fifth transistor, a source electrode thereof is input the first control signal, and a drain electrode thereof is connected to the first output end; and
   an eighth transistor configured such that a gate electrode thereof is connected to the gate electrode of the sixth transistor, a source electrode thereof is connected to the first output end, and a drain electrode thereof is connected to the low power source voltage line.

6. The liquid crystal panel of claim 4, wherein the second inverter comprises:
   a ninth transistor configured such that a gate electrode thereof is input the second control signal, a source electrode and the gate electrode thereof are in diode connection, and a drain electrode thereof is connected to a source electrode of a tenth transistor and a gate electrode of an eleventh transistor;
   the tenth transistor configured such that a gate electrode thereof is connected to a gate electrode of a twelfth transistor, the source electrode thereof is connected to the drain electrode of the ninth transistor, and a drain electrode thereof is connected to the low power source voltage line;
   the eleventh transistor configured such that the gate electrode thereof is connected to the drain electrode of the ninth transistor, a source electrode thereof is input the second control signal, and a drain electrode there is connected to the second output end; and
   the twelfth transistor configured such that the gate electrode thereof is connected to the second input end, a source electrode thereof is connected to the second output end, and a drain electrode thereof is connected to the low power source voltage line.

7. The liquid crystal panel of claim 5, wherein the first pull-down maintaining unit comprises:
   a thirteenth transistor configured such that a gate electrode thereof is connected to the first output end, a source electrode thereof is connected to a scan driving line of a current level, and a drain electrode thereof is connected to the low power source voltage line; and
   a fourteenth transistor configured such that a gate electrode thereof is connected to the gate electrode of the thirteenth transistor, a source electrode thereof is connected to the pre-charging node, and a drain electrode thereof is connected to the low power source voltage line.

8. The liquid crystal panel of claim 6, wherein the second pull-down maintaining unit comprises:
   a fifteenth transistor configured such that a gate electrode thereof is connected to the second output end, a source electrode thereof is connected to the scan driving line of the current level, and a drain electrode thereof is connected to the low power source voltage line; and
   a sixteenth transistor configured such that a gate electrode thereof is connected to the gate electrode of the fifteenth transistor, a source electrode thereof is connected to the pre-charging node, and a drain electrode thereof is connected to the low power source voltage line.

9. The liquid crystal panel of claim 1, wherein each single-stage GOA circuit unit further comprises a pull-up control unit which comprises a seventeenth thin film transistor, of which a gate electrode is input a start signal from a GOA circuit unit of an upper stage, a drain electrode is input a scan driving signal from the GOA circuit unit of the upper stage, and a source electrode is connected to the pre-charging node.

10. The liquid crystal panel of claim 1, wherein each single-stage GOA circuit unit further comprises a pull-up unit, a signal downlink unit, a bootstrap capacitance, and a pull-down unit,
   wherein the pull-up unit comprises an eighteenth transistor, of which a gate electrode is connected to a first electrode of the bootstrap capacitance and the pre-charging node Q(N), a source electrode is connected to the scan driving line SDL of the current level to output the scan driving signal, and a drain electrode is input a clock signal of the current level,
   wherein the signal downlink unit comprises a nineteenth transistor, of which a gate electrode is connected to the gate electrode of the eighteenth transistor, a drain electrode is connected to the drain electrode of the eighteenth transistor, and a source electrode outputs a start signal of the current level to be transmitted to a GOA circuit unit of a next stage;
   wherein the first electrode of the bootstrap capacitance is connected to the pre-charging node, and a second electrode of the bootstrap capacitance is connected to the scan driving line of the current level; and
   wherein the pull-down unit comprises a twentieth transistor and a twenty-first transistor, gate electrodes thereof abutting each other, drain electrodes thereof both being connected to the low voltage power source line, a source electrode of the twentieth transistor being connected to the scan driving line of the current level, and a drain electrode of the twenty-first transistor being connected to the pre-charging node.

* * * * *